United States Patent [19]

Barsa et al.

[11] 4,448,816

[45] May 15, 1984

[54] COMPOUNDS, COMPOSITIONS AND PROCESS

[75] Inventors: Edward A. Barsa, Cheshire; Philip W. Sherwood, Milford, both of Conn.

[73] Assignee: The Upjohn Company, Kalamazoo, Mich.

[21] Appl. No.: 520,352

[22] Filed: Aug. 4, 1983

[51] Int. Cl.³ .......................... C08G 18/80; A23L 2/02; B32B 27/40; C07D 233/30

[52] U.S. Cl. .......................... 427/388.2; 260/239 BC; 528/45; 528/73; 544/316; 548/320; 428/425.8; 427/27

[58] Field of Search ............. 528/45, 73; 260/239 BC; 544/316; 548/320; 427/27, 388.2; 428/425.8

[56] References Cited

U.S. PATENT DOCUMENTS

| | | | |
|---|---|---|---|
| 3,275,618 | 9/1966 | Tilley et al. | 548/320 |
| 3,320,274 | 5/1967 | Lloyd | 548/320 |
| 4,138,398 | 2/1979 | Richter et al. | 260/239.3 R |
| 4,190,599 | 2/1980 | Richter et al. | 260/453 P |
| 4,217,436 | 8/1980 | Richter et al. | 528/45 |
| 4,349,663 | 9/1982 | Barsa et al. | 528/367 |

OTHER PUBLICATIONS

Saunders and Frisch, Polyurethanes, Chemistry and Technology, Part I, pp. 8 and 118-121, 1963; Part II, pp. 453-454, 1964.

Primary Examiner—H. S. Cockeram
Attorney, Agent, or Firm—Denis A. Firth; Robert A. Armitage

[57] ABSTRACT

Described are compounds characterized by the following formula:

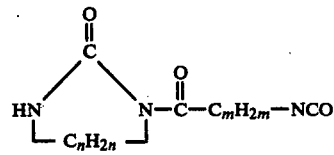

wherein $C_nH_{2n}$ is alkylene from 2 to 12 carbon atoms and $C_mH_{2m}$ is alkylene from 2 to 20 carbon atoms. Each of the alkylene groups can, optionally, be substituted by inert substituents. The compounds contain a free isocyanato group and a masked isocyanate group, namely, the cyclic urea moiety, which, when the compounds are heated, preferably in the presence of a catalyst, opens to give the group $OCN-C_nH_{2n}-$. Thus, the compounds can be reacted via the free isocyanate group with active hydrogen-containing monomers or polymers to form storage stable compositions which, upon heating, are curable via reaction with the cyclic urea group.

18 Claims, No Drawings

COMPOUNDS, COMPOSITIONS AND PROCESS

BACKGROUND OF THE INVENTION

1. Field of the Invention

This invention relates to the preparation of novel heterocyclic compounds and compositions containing them and is more particularly concerned with the preparation of N-isocyanatoalkanoyl-substituted cyclic ureas, with the preparation of stable one-component polyurethane-forming systems and with processes for preparing polyurethanes therefrom.

2. Description of the Prior Art

One-can systems (actually blends of two or more components), which are storage stable but which can, at any required time, be converted to polyurethanes, are well-known, particularly in the coating art; see, for example, Saunders and Frisch, Polyurethanes: Chemistry and Technology, Part I (pp 8 and 118-121), 1963 and Part II (pp 453-454), 1964, Interscience Publishers, New York, N.Y. Such systems generally comprise a blocked polyisocyanate and a polyol. Upon heating the mixture the blocked isocyanate groups are liberated and react with the polyol to form the polyurethane. The disadvantage of such systems is that the blocking agent (phenol, caprolactam or like agents) which is liberated in the heating process can remain trapped in the resulting resin, which can have deleterious results as far as properties of the resin are concerned, or escape as a gas which may give rise to problems of possible toxicity.

Compounds have recently been described which contain blocked isocyanate groups in the form of cyclic ureas which, upon heating, give rise to diisocyanates without liberating any blocking agent, the process being simple ring opening of the cyclic urea group; see U.S. Pat. Nos. 4,138,398; 4,190,599; 4,217,436 and 4,349,663.

We have now found that certain novel compounds, which contain one free iscoyanate group and one blocked isocyanate group in the form of a cyclic urea group, possess particular advantages in the preparation of "one-can" polyurethane systems with particular reference to such systems for use as coating compositions.

SUMMARY OF THE INVENTION

This invention comprises compounds of the formula:

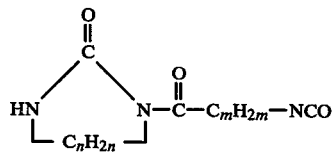 (I)

wherein $C_nH_{2n}$ represents alkylene from 2 to 12 carbon atoms, inclusive, and $C_mH_{2m}$ represents alkylene from 2 to 20 carbon atoms, inclusive, and $C_nH_{2n}$ and $C_mH_{2m}$ are each independently substituted by from 0 to 2n inert substituents and 0 to 2 m inert substituents, respectively.

This invention also comprises storage stable compositions which comprise the product of reaction of the compounds (I) with a polyol and optionally a catalyst. This invention also comprises a process for the conversion of said compositions to polyurethanes by heating to a temperature at which the cyclic urea moiety dissociates to form a free isocyanate group.

This invention also comprises the use of compounds of formula (I) as crosslinking agents for curing of polymers which contain active hydrogen groups.

The term "alkylene from 2 to 12 carbon atoms, inclusive" means a straight or branched chain alkylene group containing the stated number of carbon atoms and is inclusive of ethylene, propylene, butylene, pentylene, hexylene, heptylene, octylene, nonylene, decylene, undecylene, dodecylene and isomeric forms thereof.

The term "alkylene from 2 to 20 carbon atoms, inclusive" means a straight or branched chain alkylene group containing the stated number of carbon atoms and is inclusive of the above groups which are illustrative of alkylene from 2 to 12 carbon atoms as well as undecylene, dodecylene, tridecylene, tetradecylene, pentadecylene, hexadecylene, heptadecylene, octadecylene, nonadecylene, eicosylene, and isomeric forms thereof.

The term "inert substituent" means a substituent which is chemically inert under the reaction conditions required to prepare the compounds of formula (I) and which is also unreactive with an isocyanate group. Exemplary of such substituents are:

alkyl such as methyl, ethyl, propyl, butyl, pentyl, hexyl, and the like including isomeric forms;

alkenyl such as propenyl, butenyl, pentenyl, hexenyl, and the like including isomeric forms;

aryl such as phenyl, tolyl, xylyl, naphthyl, diphenylyl, and the like;

aralkyl such as phenethyl, benzyl, benzhydryl, phenylbutyl, naphthylmethyl and the like;

alkoxy such as methoxy, ethoxy, propoxy, butoxy, hexyloxy, and the like including isomeric forms;

alkylmercapto such as methylmercapto, ethylmercapto, butylmercapto, hexylmercapto, and the like including isomeric forms;

alkenyloxy such as propenyloxy, butenyloxy, hexenyloxy, and the like including isomeric forms;

aryloxy such as phenoxy, tolyloxy, xylyloxy, diphenylyloxy, naphthoxy and the like;

carbalkoxy, i.e. —COOAlkyl, wherein alkyl is above defined and exemplified;

haloalkyl, i.e. alkyl, as above defined and exemplified, which is substituted by one or more chloro, fluoro, bromo and or iodo groups;

haloaryl, i.e. aryl, as above defined and exemplified, which is substituted by one or more chloro, fluoro, bromo, and or iodo groups; and cyano;

DETAILED DESCRIPTION OF THE INVENTION

The compounds of formula (I) can be prepared by processes which are analogous to those known in the art. Illustratively, the appropriate cyclic urea having the formula

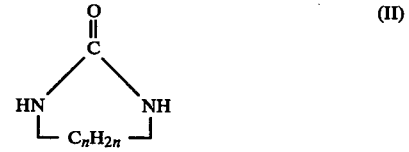 (II)

wherein $C_nH_{2n}$ is as hereinbefore defined, is reacted with an approximately equimolar amount of the appropriate isocyanotoalkanoyl halide of the formula $OCN-C_mH_{2m}-COHal$ (III)

wherein $C_mH_{2m}$ is as hereinbefore defined and Hal represents halogen, preferably chlorine or bromine. The reaction is advantageously carried out in the presence of an inert organic solvent and an acid acceptor base. By "inert organic solvent" is meant an organic solvent which does not enter into reaction with any of the above reactants or otherwise interfere in any manner with the desired course of the reaction. Illustrative of inert organic solvents are methylene chloride, ethylene dichloride, chloroform, chlorobenzene, orthodichlorobenzene, methyl ethyl ketone, acetonitrile, diethylene glycol dimethyl ether, ethylene glycol dimethyl ether, and the like.

By an "acid acceptor base" is meant a base which will remove from the reaction the hydrohalic acid which is eliminated in the condensation of the cyclic urea (II) and the isocyanatoalkanoyl halide (III). Illustrative of such bases are tertiary amines such as pyridine, triethylamine, tributylamine, N,N-dimethylpiperidine and the like. The tertiary amines form insoluble amine hydrohalide salts which are easily removed from the final reaction mixture by filtration.

The reaction of the cyclic urea (II) and the isocyanato-acid halide (III) can be effected over a wide range of temperatures, illustratively from about $-10°$ C. to about $80°$ C. and, preferably, from about $0°$ C. to about $25°$ C. The progress of the reaction can be monitored by conventional analytical procedures. Illustratively, aliquots of the reaction mixture can be taken at intervals and examined by infrared spectroscopy, nuclear magnetic resonance spectroscopy and like analytical methods. When the reaction is determined to be substantially complete, the desired reaction product of formula (I) can be isolated therefrom using conventional isolation techniques. Illustratively, the hydrohalide salt is first removed from the reaction product by the various procedures outlined above and the remaining solution of compound (I) in solvent is evaporated to dryness. The residual compound (I) is then purefied, if desired, by recrystallization, reprecipitation from solution by addition of a solvent in which the desired compound is insoluble, chromatography, and like conventional procedures.

The cyclic ureas of formula (II), which are employed as starting materials in the above process, are known compounds; see, for example, U.S. Pat. Nos. 4,138,398 and 4,349,663 cited supra. The isocyanatoalkanoyl halides (III) are, for the most part, known in the art or can be prepared by methods known in the art. Illustratively, the compounds (III), with the possible exception of those in which $C_mH_{2m}$ represents 1,3-propylene, can be prepared readily by phosgenation of the corresponding aliphatic amino carboxylic acids, advantageously in the form of their hydrohalides, using phosgenation techniques conventional in the art; see, for example, Iwakura et al., J. Organic Chemistry 31, 142, 1966, whose describe the preparation of 3-isocyanato-propanoyl chloride, 5-isocyanatopentanoyl chloride and 6-isocyanatohexanoyl chloride in good yield by phosgenation of the corresponding aminoalkanoic acid hydrochlorides in dioxane. These authors reported that phosgenation of 4-aminobutanoic acid hydrochloride gave 1-chloroformyl-5-chloro-3-dihydropyrrole and not the desired isocyanate. The preparation of 4-isocyanatobutanoic acid chloride has been reported by Kricheldorf et al., Makromol. Chem. 158, 223 (1972).

The compounds of the invention of formula (I) possess a free isocyanato group and a "blocked" isocyanate group in the form of a cyclic urea moiety and this combination of groups renders them useful in a variety of ways. For example, they can be used as thermally activatable crosslinking agents for any of a wide variety of polymers which contain groups which are reactive with isocyanate groups. In such a use the compounds (I) are reacted with the polymer in question at a relatively low temperature at which the free isocyanate group will enter into reaction with the reactive group or groups on the polymer but at which no dissociation of the cyclic urea group occurs. Subsequently, at any desired time, the polymer can be crosslinked by heating to a temperature at which the cyclic urea will dissociate and enter into reaction with a further isocyanate-reactive group on the polymer. Illustrative of polymers which contain groups which are reactive, and which can therefore be cured in the above manner, are epoxies, acrylics, polyurethanes, polyesters, polyethers, polyamides, and the like.

A particularly advantageous manner in which the compounds of formula (I) can be employed is in the curing of coating compositions in solution or powder form. The compounds (I) can either be introduced directly into such compositions or be prereacted with a di- or polyfunctional active hydrogen compound such as a low molecular weight (50–250 M.W.) glycol, triol, tetrol and the like. Illustrative of such compounds are ethylene glycol, propylene glycol, 1,4-butanediol, trimethylol ethane, trimethylol propane, pentaerythritol, sorbitol, and the like.

Thus, by reacting a compound of formula (I) in stoichiometric proportions with, for example, ethylene glycol or glycerol there are obtained the compounds shown as A and B, respectively, below:

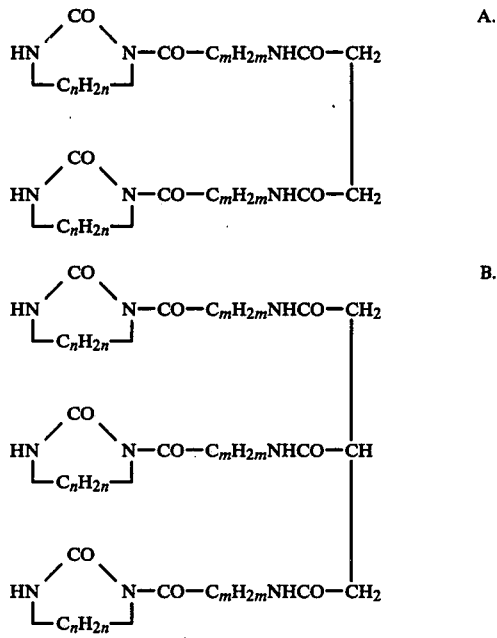

It will be seen that compound A contains 2 cyclic urea groups and B contains 3 such groups. These compounds serve as difunctional and trifunctional thermally activatable crosslinking agents, respectively.

The ability of the compounds of formula (I) to form trifunctional and higher functional thermally activatable crosslinking agents represents a significant distinction over the bifunctional bis(cyclic ureas) shown in U.S. Pat. Nos. 4,138,398 and 4,349,663 because they can give rise to a much higher degree of crosslinking.

The compounds of formula (I) or their reaction products with polyfunctional active hydrogen-containing compounds, such as A and B illustrated above, can be admixed with the other components of a coating composition and give rise to storage stable compositions which can, at any desired time, be applied to substrates and then cured by exposure to heat. The storage stable coating compositions can be liquid (i.e. contain a solvent conventionally employed with liquid coating compositions) or solid, i.e. in powder form. It is generally desirable, but not essential, to include in said coating compositions a catalyst which promotes the reaction of the cyclic urea moieties of the compounds (I) with an active-hydrogen containing material.

Any of the polyurethane catalysts known in the art can be employed for the above purpose; see, for example, Saunders et al., Polyurethanes, Chemistry and Technology, Part I, Interscience, New York, 1963, page 228–232; see also Britain et al., J. Applied Polymer Science 4,207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. The amount of catalyst employed is generally within the range of about 0.02 to about 2.0 percent by weight based on the total weight of the reactants.

The temperature to which it is necessary to heat the compounds (I), or the adducts thereof with polyfunctional active hydrogen containing compounds, in order to effect the reaction between the cyclic urea groups and active-hydrogen containing compounds employed in the coating compositions of the invention, will vary depending upon the nature of the particular compound (I) or the adduct thereof. In general, the temperature is within the range of about 130° C. to about 220° C. and more particularly in the range of about 165° C. to about 200° C.

The active-hydrogen containing compounds employed in the coating compositions of the invention can be any of the resins conventionally employed. Illustrative of such resins are epoxies, acrylics, polyurethanes, polyesters, polyethers, polyamides, and the like. In addition, the compositions may have incorporated in them, at any stage in their preparation, additives such as pigments, fillers, lubricants, stabilizers, antioxidants, coloring agents, fire retardants and the like which are commonly employed in such compositions.

While any of the compounds (I) of the invention can be employed as crosslinking and curing agents in the manner described above, it is found that those compounds of formula (I) where $C_nH_{2n}$ contains from 2 to 4 carbon atoms and $C_mH_{2m}$ contains from 2 to 5 carbon atoms give particularly advantageous results. A preferred group of compounds of formula (I) comprises those in which $C_nH_{2n}$ represents 1,3-propylene or 1,4-butylene and $C_mH_{2m}$ represents ethylene or 1,5-pentylene.

The following examples describe the manner and process of making and using the invention and set forth the best mode contemplated by the inventors of carrying out the invention but are not to be construed as limiting.

EXAMPLE 1

Preparation of N-(6-isocyanatohexanoyl)hexahydropyrimidin-2-one

A mixture of 200 g. (1.13 mole) of 6-isocyanatohexanoyl chloride (Iwakura et al., supra) and 124 g. (1.24 mole) of powdered hexahydropyrimidin-2-one [ICN Pharmaceuticals Inc.] in 900 ml. of ethanol-free chloroform was stirred at room temperature for 0.5 hour. The resulting mixture was cooled in an ice-bath and stirring was continued while a solution of 100 g. (1.26 mole) of pyridine in 100 ml. of ethanol-free chloroform was added dropwise over a period of 2 hours. When the addition was complete, the mixture was allowed to return to room temperature (ca 20° C.) and stirring was continued for a further 4 hr. The resulting product was then cooled using an ice bath and washed successively with 400 ml. of ice cold aqueous N hydrochloric acid, 400 ml. of water and 200 ml. of saturated sodium bicarbonate solution. The washed chloroform solution was then dried over anhydrous magnesium sulfate before removing the chloroform by distillation under reduced pressure. The residual yellow oil (245 g.) was dissolved in 550 ml. of ether and the solution was allowed to stand for 2 days at −20° C. in a freezer. The crystalline solid which had separated was isolated by filtration and dried in vacuo. There was thus obtained 183 g. (67 percent theoretical yield) of N-(6-isocyanatohexanoyl)hexahydropyrimidin-2-one in the form of a white crystalline solid having a melting point of 39°–42° C.

Elemental analysis: Calculated for $C_{11}H_{17}N_3O_3$: C=55.21, H=7.16, N=17.56; Found: C=55.43, H=7.46, N=17.57. I.R. ($CH_2Cl_2$): 2250 cm$^{-1}$ $C^{13}(DCCl_3)$: 175.8, 154.9, 122.0, 42.9, 41.8, 40.5, 38.3, 31.1, 26.2, 24.6, 21.9δ.

EXAMPLE 2

Preparation of N-(3-isocyanatopropanoyl)hexahydropyrimidin-2-one

Using the procedure described in Example 1, but replacing the 6-isocyanatohexanoyl chloride there employed by an equivalent amount of 3-isocyanatopropanoyl chloride (Iwakura et al., supra), there was obtained N-(3-isocyanatopropanoyl)hexahydropyrimidin-2-one in the form of a white crystalline solid which, after recrystallization from toluene, had a melting point of 61°–63° C. The yield of recrystallized product was 72.9 percent theoretical based on isocyanato acid chloride.

Elemental Analysis: Calculated for $C_8H_{11}N_3O_3$: C=48.72, H=5.62, N=21.31; Found: C=48.77, H=5.53, N=21.27 I.R. ($CH_2Cl_2$): 2250 cm$^{-1}$ $C^{13}(DCCl_3)$: 173.0, 154.6, 123.2, 41.9, 40.5, 40.01, 38.98, 21.6δ.

Similarly, using the procedure described in Example 1, but replacing the 6-isocyanatohexanoyl chloride there employed by 5-isocyanatohexanoyl chloride,
7-isocyanatoöctanoyl chloride,
9-isocyanatononanoyl chloride,
6-isocyanato-2-propylhexanoyl chloride,
8-isocyanato-5-methyloctanoyl chloride,
6-isocyanatononanoyl chloride, 5-isocyanato-4,8-dimethylnonanoyl chloride,
7-isocyanatoundecanoyl chloride,
10-isocyanatodecanoyl chloride,
11-isocyanatododecanoyl chloride,
5-isocyanatotridecanoyl chloride,
15-isocyanatopentadecanoyl chloride,
16-isocyanatohexadecanoyl chloride,
17-isocyanatoheptadecanoyl chloride,
10-isocyanato-16-methylheptadecanoyl chloride, and
6-isocyanatoöctadecanoyl chloride, there can be obtained
N-(5-isocyanatohexanoyl)-,
N-(7-isocyanatoöctanoyl)-,
N-(9-isocyanatononanoyl)-,
N-(6-isocyanato-2-propylhexanoyl)-,
N-(8-isocyanato-5-methyloctanoyl)-,
N-(6-isocyanatononanoyl)-,
N-(5-isocyanato-4,8-dimethylnonanoyl)-,
N-(7-isocyanatoundecanoyl)-,
N-(10-isocyanatodecanoyl)-,
N-(11-isocyanatododecanoyl)-,
N-(5-isocyanatotridecanoyl)-,
N-(15-isocyanatopentadecanoyl)-,
N-(16-isocyanatohexadecanoyl)-,
N-(17-isocyanatoheptadecanoyl)-,
N-(10-isocyanato-16-methylheptadecanoyl)-, and
N-(6-isocyanatoöctadecanoyl)hexahydropyrimidin-2-one, respectively.

The various isocyanatoalkanoyl chlorides employed as starting materials can be prepared from the corresponding aminoalkanoic acids, all of which are known compounds, using the method of Iwakura et al, supra.

EXAMPLE 3

Using the procedure described in Example 1, but replacing the hexahydropyrimidin-2-one there employed by an equivalent amount of 2-imidazolidinone, there can be obtained N-(6-isocyanatohexanoyl)-2-imidazolidinone.

Similarly, using the procedure described in Example 1, but replacing the hexahydropyrimidin-2-one by an equivalent amount of tetramethyleneurea, pentamethyleneurea, nonamethyleneurea, decamethyleneurea, or 5,5-dimethyl-6-isopropylhexahydropyrimidin-2-one, there can be obtained
N-(6-isocyanatohexanoyl)tetramethyleneurea,
N-(6-isocyanatohexanoyl)pentamethyleneurea,
N-(6-isocyanatohexanoyl)nonamethyleneurea,
N-(6-isocyanatohexanoyl)decamethyleneurea, and
N-(6-isocyanatohexanoyl)-5,5-dimethyl-6-isopropyl-hexahydropyrimidin-2-one, respectively.

EXAMPLE 4

This Example shows the use of N-(6-isocyanatohexanoyl)hexahydropyrimidin-2-one [hereinafter "CU.NCO(6)"] in a solution coating process.

Five grams of a hydroxy functional acrylic resin solution having a 60% non-volatile content by weight and a hydroxyl equivalent weight of 600 based on solids (commercially available from Henkel Corporation under the trade name G-Cure 867-RWF-60) were combined with 0.6 g. of CU.NCO(6) and 0.04 g. of dibutyltin dilaurate catalyst and heated at 80° C. with stirring until there were essentially no active isocyanate groups present as indicated by infrared analysis at 2250 cm$^{-1}$. After cooling, the mixture was drawn over a zinc phosphate treated steel panel using a Gardner film casting knife. After a 15-minute ambient dry time the coating was cured for 30 minutes at 175° C. to produce a 2-mil thick film having a pencil hardness of 4H/F (ASTM D3363-74) and a conical mandrel flexibility of $<\frac{1}{8}''$ (ASTM D522-60). Five minutes exposure to methyl ethyl ketone softened the film but did not dissolve it.

EXAMPLE 5

This Example shows another illustration of the use of CU.NCO(6) in a solution coating process.

Fifty grams (0.125 equivs.) of a hydroxy functional acrylic resin solution having a 60% non-volatile content by weight and a hydroxyl equivalent weight of 374 based on solids (commercially available from Cook Paint & Varnish Co. under the trade name COROC A-2500-M) were combined with 9.6 g. of CU.NCO(6) (0.125 equivs. total NCO), 25 g. of methyl ethyl ketone, 25 g. of ethylene glycol monoethylether acetate, 0.4 g. of dibutyltin dilaurate catalyst, and 0.4 g. of a silicone oil flow additive (Dow No. 57), and heated at 80° C. until there were essentially no active isocyanate groups present as indicated by infrared analysis at 2250 cm.$^{-1}$ After cooling, the reacted mixture was sprayed on to zinc phosphate treated steel panels. After a 15-minute ambient dry time, the coating was cured for 30 minutes at 175° C. to produce a 2-mil thick film having a pencil hardness of 3H/B and a conical mandrel flexibility of $<\frac{1}{8}''$. Five minutes exposure to methyl ethyl ketone softened the film but did not dissolve it.

EXAMPLE 6

This Example shows the use of N-(3-isocyanatopropanoyl)hexahydropyrimidin-2-one [hereinafter "CU.NCO(3)"] in a solution coating process.

The procedure described in Example 2 was repeated, except that 7.9 g. of CU.NCO(3) (0.125 equivs. total NCO) was used in place of the 9.6 g. of CU.NCO(6). After curing for 30 minutes at 175° C., a 2-mil thick film exhibited a pencil hardness of 2H/HB and a conical mandrel flexibility of $<\frac{1}{8}''$. Five minutes exposure to methyl ethyl ketone softened the film but did not dissolve it.

EXAMPLE 7

This Example shows the use of CU.NCO(6) in a powder coating process.

Fifty grams (0.125 equivs.) of a diglycidyl ether of bisphenol A-type epoxy resin having a calculated hydroxyl equivalent weight of 400 (commercially available from Celanese Corporation under the trade name Epi-Rez 552C) were compounded with 30 g. of a pigment grade titanium dioxide, 0.6 g. of dibutyltin dilaurate catalyst, and 0.6 g. of a silicone oil flow additive (Dow No. 57) on a two roll mill at 60° C. fast roll/ambient temperature slow roll. After thorough mixing of these ingredients, 14.9 g. (0.125 equivs. total NCO) of CU.NCO(6) was compounded into the blend in small (approx. 1 g.) increments. After all of the CU.NCO(6) was added, the resin was compounded at 60° C. for an additional 30 minutes. The resin was then removed from the mill, cooled, ground to a fine (<200 mesh) powder, and electrostatically sprayed on to zinc phosphate treated steel panels. The coating was then cured for 30 minutes at 175° C. to produce a 2-mil thick film having a pencil hardness of 6H/F and a conical mandrel flexibility of $<\frac{1}{8}''$. Five minutes exposure to methyl ethyl ketone softened the film but did not dissolve it. The pencil hardness of the film immediately after MEK exposure was 4B.

EXAMPLE 8

Adducts of CU.NCO(6) with trimethylolethane (TME) and trimethylolpropane (TMP) and an adduct of CU.NCO(3) with trimethylolpropane were prepared using the following materials and proportions (all parts by weight).

|  | Adduct |  |  |
| --- | --- | --- | --- |
|  | A | B | C |
| CU.NCO(6) | [a]23.9 | [a]23.9 | — |
| CU.NCO(3) | — | — | [a]19.7 |
| TME | 4.0[b] | — | — |
| TMP | — | 4.5[b] | 4.5[b] |
| Catalyst[1] | 0.1 | 0.1 | 0.1 |
| Chloroform | 150 | 150 | 150 |

Footnotes
[a]represents 0.1 equivalent of free NCO
[b]represents 0.1 equivalent of hydroxyl
[1]dibutyltin dilaurate The procedure adopted in the preparation of all three adducts was as follows. The reactants and catalyst were combined in the chloroform solution and the mixture was heated under reflux for 16 hours. At the end of this time the chloroform was removed by distillation and the last traces were removed under vacuum. The adduct remained as a glassy residue. Infrared analysis showed essentially no free isocyanate groups present in the products.

The adducts so obtained were believed to correspond to the following structural formulae:

Adduct A:                                                                    Eq. wt. = 279

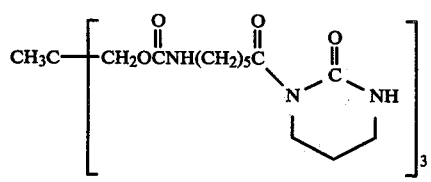

Adduct B:                                                                    Eq. wt. = 284

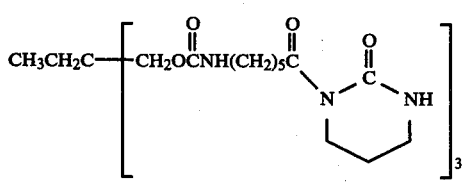

Adduct C:                                                                    Eq. wt. = 242

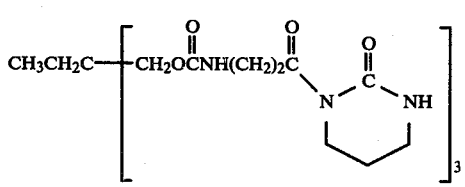

The use of the above adducts as curing agents in powder coating processes is illustrated in Examples 9 through 12.

EXAMPLE 9

Fifty grams (0.045 equivs.) of a hydroxy functional polyester resin having a hydroxyl equivalent weight of 1100 (commercially available from CIBA-Geigy Corporation under the trade name Arakote 3006) were compounded with 12.4 g. (0.044 equivs.) of the Adduct A of Example 8, 30 g. of pigment grade titanium dioxide, 0.6 g. of dibutyltin dilaurate catalyst, and 0.6 g. of a silicone oil flow additive (Union Carbide L7500) on a two roll mill at 75° C. fast roll/ambient temperature slow roll for approximately 15 minutes. The resin was then removed from the mill, cooled, ground to a fine (<200 mesh) powder, and electrostatically sprayed on to zinc phosphate treated steel panels. The coating was then cured for 30 minutes at 175° C., producing a 2-mil thick film having a pencil hardness of 6H/2B, a conical mandrel flexibility of <⅛", and impact resistance of >160 in.-lb. direct, >160 in.-lb. reverse (ASTM D2794-69). Five minutes exposure to methyl ethyl ketone softened the film but did not dissolve it.

EXAMPLE 10

The procedure described in Example 9 was repeated, except that 12.8 g. (0.045 equivs.) of the Adduct B of Example 8 were used in place of the 12.4 g. of the Adduct A. After curing for 30 minutes at 175° C., a 2-mil thick film had the following properties: pencil hardness, 6H/2B; conical mandrel flexibility, <⅛", impact resistance, >160 in.-lb. direct and >160 in.-lb. reverse. Five minutes exposure to methyl ethyl ketone softened the film but did not dissolve it.

EXAMPLE 11

The procedure described in Example 9 was repeated, except that 10.8 g. (0.045 equivs.) of the Adduct C of Example 8 were used in place of the 12.4 g. of the Adduct A. After curing for 30 minutes at 175° C., a 2-mil thick film had the following properties: pencil hardness, 5H/2B; conical mandrel flexibility, <⅛"; impact resistance, 100 in.-lb. direct and 40 in.-lb. reverse. Five minutes exposure to methyl ethyl ketone softened the film but did not dissolve it.

EXAMPLE 12

Fifty grams (0.045 equivs.) of a hydroxy functional polyester resin having a hydroxyl equivalent weight of 1100 (commercially available from Cargill, Inc. under the trade name Cargill 3000) were compounded with 12.8 g. (0.045 equivs.) of the Adduct B of Example 5, 30 g. of pigment grade titanium dioxide, 0.6 g. of dibutyltin dilaurate catalyst, and 2.5 g. of a polyacrylate flow additive (Monsanto Modaflow Powder II) on a two roll mill at 75° C. fast roll/ambient temperature slow roll for approximately 15 minutes. The resin was then removed from the mill, cooled, ground to a fine (<200 mesh) powder, and electrostatically sprayed on to zinc phosphate treated steel panels. The coating was then cured for 30 minutes at 175° C., producing a 2-mil thick film having a pencil hardness of 3H/2B, a conical mandrel flexibility of <⅛", and impact resistance of 80 in. lb. direct, 60 in.-lb. reverse. Five minutes exposure to methyl ethyl ketone softened the film but did not dissolve it.

EXAMPLE 13

This Example illustrates the use of CU.NCO(6) in the preparation of a cast polyurethane elastomer.

Twenty-five grams (0.075 equivs.) of a polyether triol having a hydroxyl equivalent weight of 334 (commercially available from the Olin Corporation under the trade name of Poly G 30-168) and 0.4 g. of dibutyltin dilaurate catalyst were combined and heated to approximately 90° C. in a 2-inch diameter aluminum dish. Nine grams (0.076 equivs. total NCO) of CU.NCO(6) were added gradually and with stirring such that the reaction exotherm did not exceed 100° C. After the CU.NCO(6) addition was complete, the mixture was degassed for 30 minutes at 115° to 120° C. under a vacuum of 0.1 mm of Hg. The degassed liquid* was subsequently cured for 30 minutes at 175° C. to produce a transparent, flexible elastomer which, having a thickness of approximately 0.3 inches, was devoid of any entrapped bubbles.

*This product was stable and, if necessary, could be stored for extended periods before being cured by heating as described in the above procedure.

We claim:

1. A compound having the formula

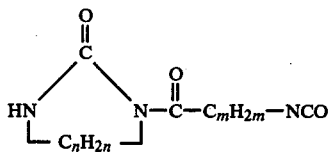

wherein $C_nH_{2n}$ represents alkylene from 2 to 12 carbon atoms, inclusive, and $C_mH_{2m}$ represents alkylene from 2 to 20 carbon atoms, inclusive, and $C_nH_{2n}$ and $C_mH_{2m}$ are each independently substituted by from 0 to 2n inert substituents and 0 to 2m substituents, respectively.

2. A compound according to claim 1 wherein $C_nH_{2n}$ represents 1,3-propylene and $C_mH_{2m}$ represents ethylene, said compound being N-(3-isocyanatopropanoyl)-hexahydropyrimidin-2-one.

3. A compound according to claim 1 wherein $C_nH_{2n}$ represents 1,3-propylene and $C_mH_{2m}$ represents 1,5-pentylene, said compound being N-(6-isocyanatohexanoyl)hexahydropyrimidin-2-one.

4. An adduct obtained by reacting a compound according to claim 1 with a low molecular weight polyfunctional active hydrogen containing compound in proportions such that the ratio of total free isocyanate groups to total active hydrogen containing groups is substantially 1.0.

5. An adduct according to claim 4 obtained by reacting substantially 3 molar proportions of N-(3-isocyanatopropanoyl)hexahydropyrimidin-2 one with substantially 1 molar proportion of trimethylolpropane, said adduct corresponding to the formula:

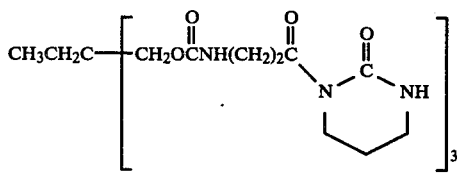

6. An adduct according to claim 4 obtained by reacting substantially 3 molar proportions of N-(6-isocyanatohexanoyl)hexahydropyrimidin-2-one with substantially 1 molar proportion of trimethylolpropane said adduct corresponding to the formula:

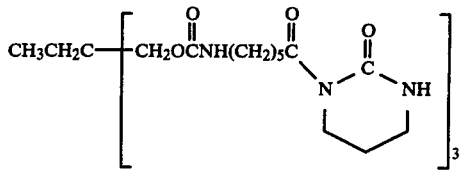

7. An adduct according to claim 4 obtained by reacting substantially 3 molar proportions of N-(6-isocyanatohexanoyl)hexahydropyrimidin-2-one with substantially 1 molar proportion of trimethylolethane said adduct corresponding to the formula

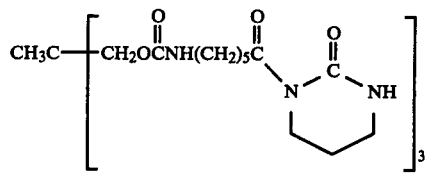

8. A process for the preparation of a polyurethane which comprises reacting a compound according to claim 1 with a polyol in the presence of a urethane catalyst and heating the reaction mixture at a temperature sufficient to effect ring opening of the hexahydropyrimidin-2-one moiety.

9. A process for coating a substrate with a polyurethane coating, said process comprising reacting a compound according to claim 1 with a polyol in the presence of a urethane catalyst at a temperature sufficient to allow reaction between the free isocyanate group in said compound of claim 1 and hydroxyl groups in said polyol but insufficient to cause ring opening of the hexahydropyrimidin-2-one moiety, applying the product so obtained as a coating to a substrate and subsequently curing said coating by heating to a temperature at which ring opening of said hexahydropyrimidin-2-one moiety occurs.

10. A process according to claim 9 wherein the compound according to claim 1 employed therein is N-(3-isocyanatopropanoyl)hexahydropyrimidin-2-one.

11. A process according to claim 9 wherein the compound according to claim 1 employed therein is N-(6-isocyanatohexanoyl)hexahydropyrimidin-2-one.

12. A process according to claim 9 wherein the reaction is carried out in the presence of an inert solvent.

13. A process according to claim 9 wherein the reaction is carried out in the absence of an inert solvent.

14. A process for applying a coating of polymer containing active hydrogen groups to a substrate which comprises the steps of:

admixing an adduct according to claim 4 with said polymer and a urethane catalyst at a temperature less than that required to effect ring opening of the hexahydropyrimidin-2-one moiety in said adduct to claim 4;

applying the resulting product as a coating to said substrate; and heating said coating to a temperature sufficient to effect ring opening of said hexahydropyrimidin-2-one moiety.

15. A process according to claim 14 wherein said adduct is that obtained by reacting substantially 3 molar proportions of N-(3-isocyanatopropanoyl)hexahydropyrimidin-2-one with substantially 1 molar proportion of trimethylolpropane.

16. A process according to claim 14 wherein said adduct is that obtained by reacting substantially 3 molar proportions of N-(6-isocyanatohexanoyl)hexahydropyrimidin-2-one with substantially 1 molar proportion of trimethylolpropane.

17. A process according to claim 14 wherein said adduct is that obtained by reacting substantially 3 molar proportions of N-(6-isocyanatohexanoyl)hexahydropyrimidin-2-one with substantially 1 molar proportion of trimethylolethane.

18. A process for curing a polymer containing active hydrogen groups which comprises heating said polymer with a compound according to claim 1 at a temperature sufficient to effect ring opening of the hexahydropyrimidin-2-one moiety present in said compound.

* * * * *